US011300150B2

(12) United States Patent
Tulloch et al.

(10) Patent No.: US 11,300,150 B2
(45) Date of Patent: Apr. 12, 2022

(54) BARREL NUT

(71) Applicant: Airbus Operations Limited, Bristol (GB)

(72) Inventors: William Tulloch, Bristol (GB); Pat Broomfield, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 370 days.

(21) Appl. No.: 16/427,602

(22) Filed: May 31, 2019

(65) Prior Publication Data

US 2019/0368531 A1  Dec. 5, 2019

(30) Foreign Application Priority Data

Jun. 1, 2018 (GB) ...................................... 1808978
Jan. 8, 2019 (GB) ...................................... 1900249

(51) Int. Cl.
*F16B 37/04* (2006.01)
*B64D 27/26* (2006.01)

(52) U.S. Cl.
CPC ............ *F16B 37/047* (2013.01); *B64D 27/26* (2013.01)

(58) Field of Classification Search
CPC ...... F16B 37/04; F16B 37/044; F16B 37/047; B64D 27/26
USPC ......................................... 411/103, 104, 105
See application file for complete search history.

(56) References Cited

U.S. PATENT DOCUMENTS

| 2,789,457 A | * | 4/1957 | Allen | F16B 37/047 411/432 |
| 2,920,672 A | * | 1/1960 | Bronson | F16B 37/047 411/104 |
| 3,081,809 A | * | 3/1963 | Rohe | F16B 37/047 411/104 |
| 3,192,982 A | * | 7/1965 | Rohe | F16B 37/047 411/104 |
| 3,205,927 A | * | 9/1965 | Phelan | F16B 37/047 411/104 |
| 3,208,496 A |   | 9/1965 | Phelan |  |
| 3,406,605 A | * | 10/1968 | Kviten | F16B 35/00 411/389 |
| 4,488,844 A | * | 12/1984 | Baubles | F16B 37/045 411/103 |
| 5,032,047 A | * | 7/1991 | Theakston | F16B 37/047 411/104 |
| 5,489,173 A | * | 2/1996 | Hofle | F16B 37/045 411/85 |

(Continued)

FOREIGN PATENT DOCUMENTS

| EP | 3 085 626 | 10/2016 |
| FR | 3026151 | 3/2016 |
| GB | 823188 | 11/1959 |

OTHER PUBLICATIONS

European Search Report for European Application No. 19174631.2, nine pages, dated Oct. 17, 2019.

(Continued)

*Primary Examiner* — Roberta S Delisle

(74) *Attorney, Agent, or Firm* — Nixon & Vanderhye P.C.

(57) ABSTRACT

A barrel nut for a fastener is disclosed. The barrel nut is configured to prevent axial movement of the fastener relative to a structure on which the fastener is installed. The barrel nut comprises a first part and a second part pivotable relative to the first part.

19 Claims, 5 Drawing Sheets

(56) References Cited

U.S. PATENT DOCUMENTS

| | | | | |
|---|---|---|---|---|
| 6,173,919 B1* | 1/2001 | Le Blaye | ............... | B64D 27/26 |
| | | | | 244/54 |
| 8,998,548 B2* | 4/2015 | Kousens | ............... | F16B 37/044 |
| | | | | 411/104 |
| 2010/0127118 A1* | 5/2010 | Combes | ................. | B64D 27/26 |
| | | | | 244/54 |

OTHER PUBLICATIONS

Combined Search and Examination Report for GB1808978.9, dated Jun. 28, 2018, 6 pages.

* cited by examiner

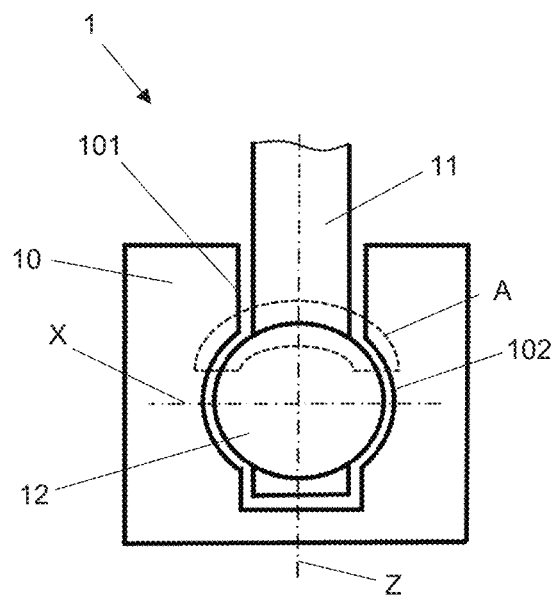
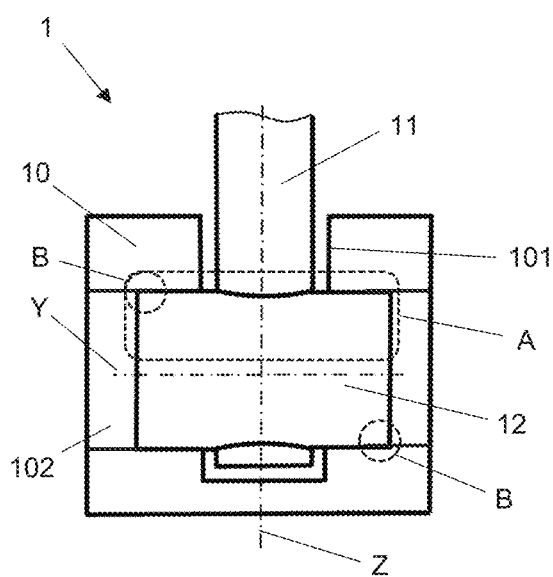
Fig. 1a
(PRIOR ART)
Fig. 1b
(PRIOR ART)
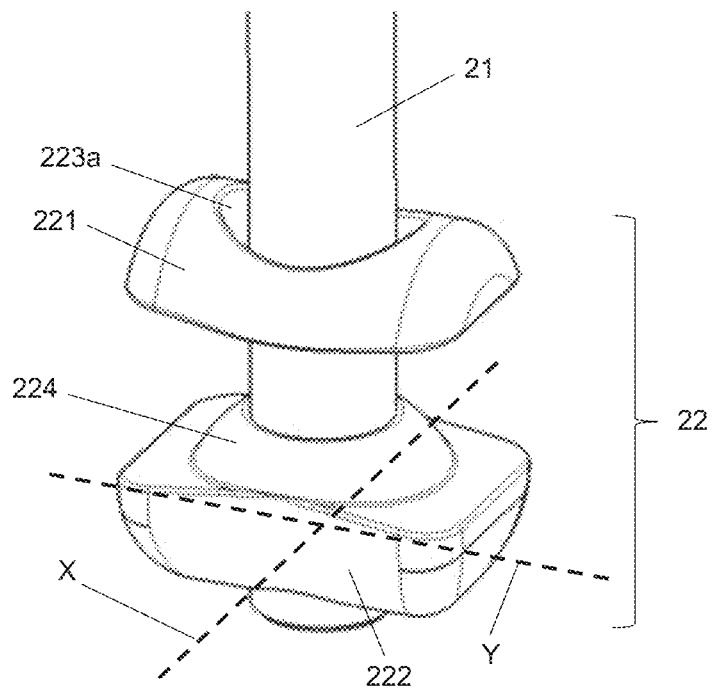
Fig. 2a

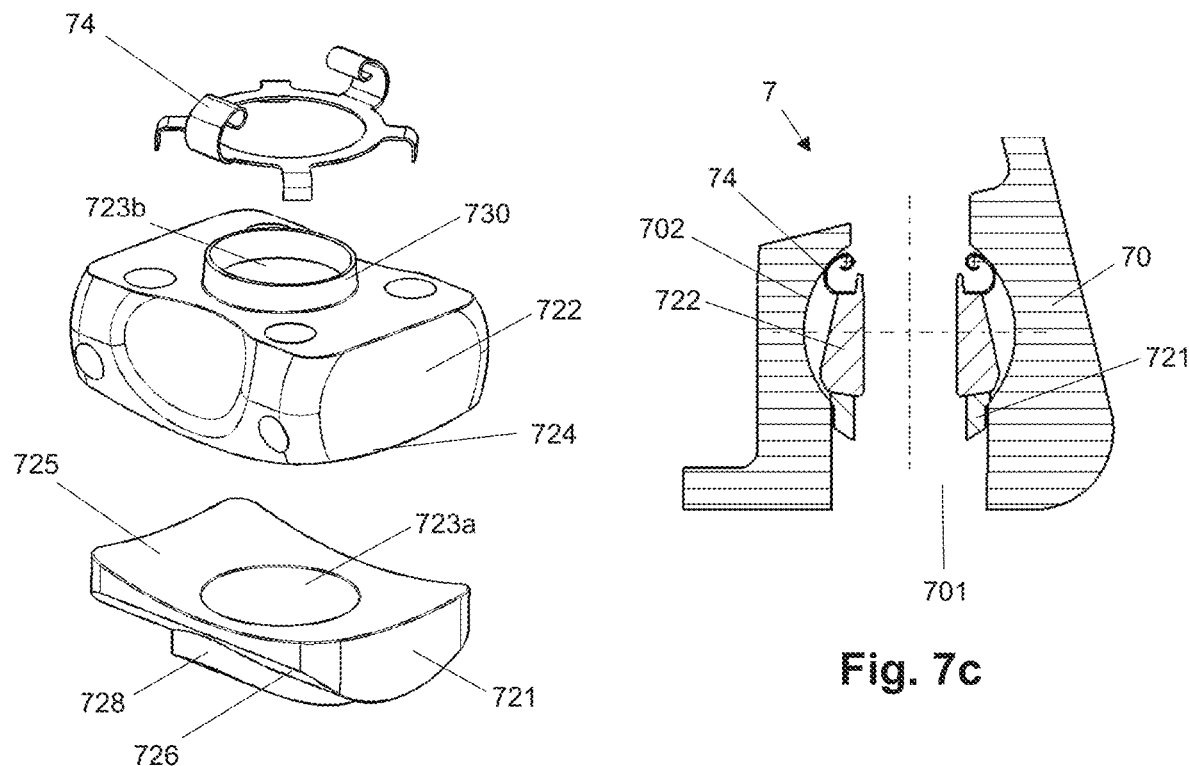
Fig. 7b
Fig. 7c
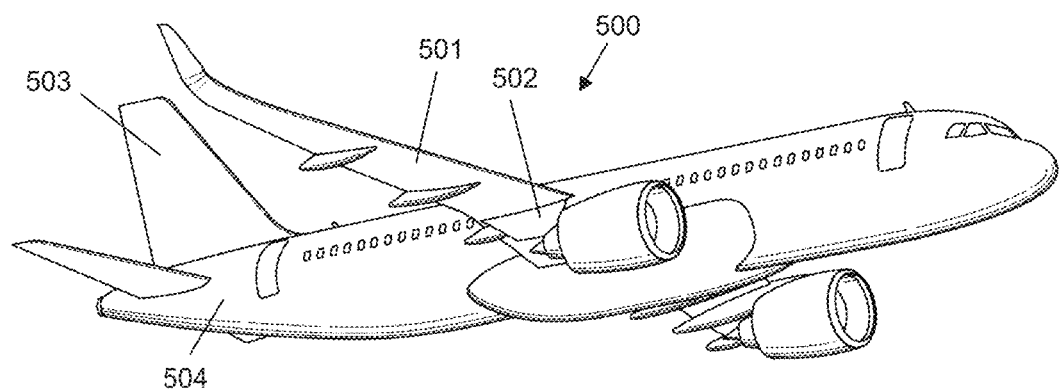
Fig. 5

BARREL NUT

CROSS RELATED APPLICATIONS

This application claims priority to United Kingdom (GB) Patent Application 1808978.9, filed Jun. 1, 2018, and United Kingdom (GB) Patent Application 1900249.2, filed Jan. 8, 2019, the entire contents of each of which are hereby incorporated by reference.

TECHNICAL FIELD

The present invention relates to a barrel nut for a fastener, and to an assembly comprising a first structure and a second structure held together by a fastener and a barrel nut.

BACKGROUND

A conventional barrel nut comprises a cylindrical body, with a threaded bore extending perpendicularly to the axis of the cylinder. The cylindrical nut body is typically contained within a bore or in a structure, and may rotate about its axis relative to the structure. Variances in the angle of a fastener stem engaged with the barrel nut within a cross-sectional plane of the cylindrical body may therefore be accommodated by rotating the barrel nut relative to the structure. The cylindrical body is in contact with the inner surface of the bore in the structure over a significant part of its surface, irrespective of such variances in the angle of the fastener, ensuring that loads can be transmitted between the nut and the structure across a relatively large area.

However; the conventional barrel nut is not intended to pivot about any axis other than the axis of the cylindrical body. As such, fastener stem angle variances which are out of a cross-sectional plane of the cylindrical body cannot be accommodated, and may cause the barrel nut to seat incorrectly in the bore. This can result in loads being transmitted between the barrel nut and structure across a much smaller region than intended, and/or impose bending loads on the fastener. These effects could cause excessive fatigue to the nut, the fastener and/or the structure. To avoid this situation arising, barrel nuts used for high-load applications must generally be visible after installation so that their seating can be carefully checked. The requirement for visibility places significant limitations on the situations in which conventional barrel nuts can be used, and the need to check the seating makes the installation of conventional barrel nuts time-consuming and complex.

It may be desirable to use a barrel nut in an application where visual access to the nut after it is installed is difficult or impossible. For example, when mounting structures to an aircraft wing box it may not be possible to access the interior space of the wing box. As such, any fasteners to mount structures to the wing box must be suitable for one-sided (or "blind") installation. One-sided installation means that the fastener is installed entirely from the exterior of the wing box, so that the installation process does not require any access to the interior of the wing box.

SUMMARY

A first aspect of the present invention provides a barrel nut for a fastener. The barrel nut is configured to prevent axial movement of the fastener relative to a structure on which the fastener is installed. The barrel nut comprises a first part and a second part pivotable relative to the first part.

Optionally, the barrel nut is configured such that the second part is pivotable relative to the first part about at least one axis and is pivotable relative to the structure about two orthogonal axes.

Optionally, the first part comprises a load transmission surface configured to contact a region on the structure for transmitting loads thereto. Optionally, the load transmission surface is shaped to match the region on the structure. Optionally, the load transmission surface is convex, and the region is concave. Optionally, the load transmission surface provides at least 25% of the surface area of the first part.

Optionally, the second part comprises a load transmission surface configured to contact a region on the first part for transmitting loads thereto.

Optionally, the second part is configured to engage with a stem of the fastener to resist relative axial movement of the fastener and the second part.

Optionally, the barrel nut comprises a bore extending through the first part and the second part, wherein the bore is configured to receive a stem of the fastener. Optionally, a part of the bore extending through the first part has a larger diameter than a part of the bore extending through the second part.

Optionally, the barrel nut is configured such that the fastener is installable by relative rotation of the fastener and the second part, about the axis of the fastener.

Optionally, the first part comprises a washer having a first bearing surface, and the second part comprises a nut having a second bearing surface configured to contact the first bearing surface in an operational configuration of the barrel nut. Optionally, the second bearing surface is part-spherical to permit relative pivoting movement of the first part and the second part about two orthogonal axes. Optionally, the barrel nut further comprises a retaining member configured to resist separation of the first part and the second part whilst permitting relative pivoting movement of the first part and the second part about two orthogonal axes.

Optionally, the first part comprises a first cylinder having a first radial bore to receive a stem of the fastener, and a second radial bore orthogonal to and intersecting with the first bore; and the second part comprises a second cylinder disposed within the second radial bore, the second cylinder having a third radial bore configured to receive and engage with the stem of the fastener. Optionally, an interior surface of the second radial bore is configured for sliding contact with an exterior surface of the second cylinder to permit pivoting of the second part relative to the first part about the axis of the second cylinder; and an exterior surface of the first cylinder is configured for sliding contact with a surface of the structure to permit pivoting of the barrel nut relative to the structure about the axis of the first cylinder.

Optionally, the cross-sectional profile of the barrel nut is configured such that a gap exists between an outer surface of the barrel nut and an inner surface of a bore in which the barrel nut is configured to be received, when the barrel nut is received in the bore. Optionally, an outer surface of the barrel nut adjacent the gap is opposite a load transmission surface of the barrel nut. Optionally, an outer surface of the barrel nut adjacent the gap is substantially flat.

Optionally, the barrel nut further comprises a resilient member provided on the outer surface of the barrel nut adjacent the gap. The resilient member is configured to push against the outer surface of the barrel nut adjacent the gap and against an inner surface of the bore adjacent the gap, when the barrel nut is received in the bore.

Optionally, a deformable locking feature is provided on the outer surface of the barrel nut adjacent the gap, coaxial with a bore extending through the barrel nut that is configured to receive the stem of a fastener. The deformable locking feature may be in the form of an annular protrusion. An inner diameter of the deformable locking feature may be smaller than an inner diameter of the bore extending through the barrel nut. An inner diameter of the deformable locking feature may be smaller than an outer diameter of the stem of a fastener with which the barrel nut is configured to be engaged.

Optionally, a surface of the barrel nut configured to abut an inner surface of a bore in which the barrel nut is received comprises a protrusion configured to engage with a corresponding recess in the inner surface of the bore. Optionally, the protrusion comprises an annular lip configured to be received within the mouth of a fastener hole which intersects the bore. Optionally, the protrusion is smaller than the recess, such that a limited amount of rotational movement of the protrusion relative to the recess, about the axis of the barrel nut, is permitted when the protrusion is engaged with the recess.

A second aspect of the invention provides an assembly. The assembly comprises a first structure; a second structure; a fastener extending through the first structure and the second structure; and a two-part barrel nut engaged with the fastener such that separation of the first structure and the second structure is substantially prevented by the engagement of the fastener with the two-part barrel nut. The two-part barrel nut comprises a first nut part having a first bearing surface and a second nut part having a second bearing surface in contact with the first bearing surface. The first and second bearing surfaces are configured for rotational movement relative to each other about a first axis.

Optionally, the first and second bearing surfaces are further configured for rotational movement relative to each other about a second axis orthogonal to the first axis; or the two-part barrel nut is configured for rotational movement relative to one of the first and second structures about the second axis.

Optionally, the two-part barrel nut is a barrel nut according to the first aspect.

Optionally, each of the structures comprises an aircraft structure.

A third aspect of the invention provides an aircraft comprising an assembly according to the second aspect.

BRIEF DESCRIPTION OF THE DRAWINGS

Embodiments of the invention will now be described, by way of example only, with reference to the accompanying drawings, in which:

FIG. 1a is a schematic end view of an example prior art barrel nut, installed on a fastener and a structure;

FIG. 1b is a schematic side view of the example prior art barrel nut of FIG. 1a;

FIG. 2a is a perspective view of an example barrel nut according to the invention, together with part of a fastener;

FIG. 5 is an example aircraft comprising a barrel nut according to the invention.

FIGS. 7a-7c show a further example of the barrel nut according to the invention.

DETAILED DESCRIPTION

Figure 2B:
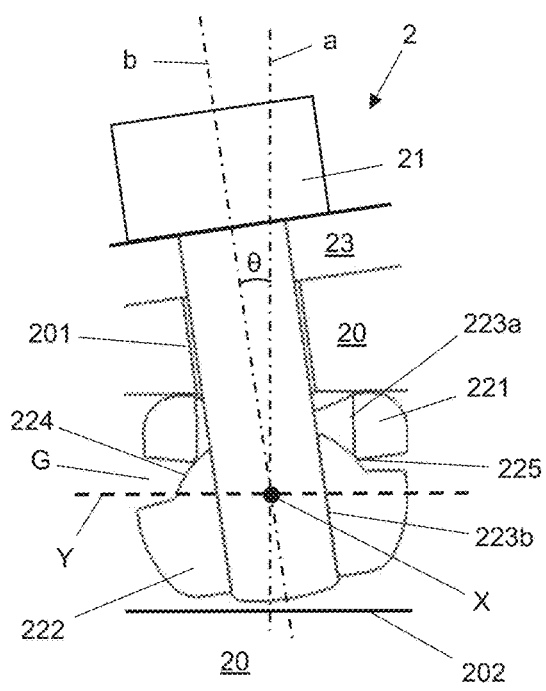
FIG. 2b is a cross-section through the Y axis of an example assembly comprising the example barrel nut of FIG. 2a, a fastener, and first and second structures.

FIGS. 1a and 1b show a known type of barrel nut 12, installed on a fastener 11 to prevent axial movement of the fastener 11 relative to a structure 10. The fastener 11, barrel nut 12, and structure 10 may together be considered to form an assembly 1. The fastener 11 has a long axis Z, and the barrel nut 12 has a long axis Y, which in the illustrated example is substantially orthogonal to the fastener axis Z. The body of the barrel nut is retained within a correspondingly sized bore 102 in the structure 10. Before the fastener 11 is engaged with the nut 12, the barrel nut 12 is able to slide within the bore 102 along the Y axis, and may also pivot about the Y axis but is substantially prevented from rotational or translational movement in any other directions by the fit between the bore 102 and the body of the barrel nut 12. Barrel nuts can be advantageous in predominantly tension loaded applications as load transfer can be more efficient as compared with conventional nuts.

The barrel nut 12 engages with a stem part of the fastener 11 by screwing a threaded part of the fastener stem into a threaded bore that extends through the barrel nut 12 in the Z direction. The fastener stem also passes through a bore 101 in the structure, which is substantially aligned (i.e. coaxial) with the bore in the barrel nut 12. Relative movement of the barrel nut 12 and the fastener 11 along the axial direction of the fastener is prevented by the engagement between the threads. The fastener 11 includes a head part (not shown), which enables the fastener 11 and nut 12 combination to exert a clamping force on the structure 10 (and typically one or more further structures which the fastener stem also passes through).

The possibility for the barrel nut 12 to pivot about the Y axis when it is received in the bore 102 means that it can self-align with the fastener 11 during installation of the fastener 11. Due to manufacturing tolerances (e.g. associated with the creation of the bore in the structure 10), the fastener axis may not be exactly orthogonal to an axis X (which is orthogonal to both the Y and Z axes). If this is the case, the barrel nut 12 can rotate about the Y axis to accommodate deviations within the X-Z plane. However; it is also possible that manufacturing tolerances may cause the fastener axis to deviate from the Z axis in the Y-Z plane. The barrel nut 12 is not configured to pivot about the X axis (and is substantially prevented from doing so by its fit within the bore 102), and so cannot accommodate such deviations.

Variances of the fastener axis angle within the Y-Z plane will cause the barrel nut to be in close contact with the inside surface of the bore only in relatively small regions rather than across a relatively large region A. For example, if the fastener axis is tilted to the right, with respect to the orientation shown in FIG. 1b, the barrel nut will be in close contact with the inside surface of the bore only in the regions B. In this situation the barrel nut 12 is considered not to be properly seated in the bore 102. Improper seating of the barrel nut 12 is problematic because all of the load transmitted between the barrel nut 12 and the structure 10 is concentrated in the small regions of close contact rather than being spread across the whole region A. Moreover, a bending force is imposed on the fastener stem. Consequently, barrel nuts of the type shown in FIGS. 1a and 1b must be carefully inspected after installation to check the seating, and reinstalled if necessary. This inspection process is time consuming, and requires the barrel nut to be visible from outside the structure (so blind installation is precluded).

Example barrel nuts according to the invention seek to address these limitations of known barrel nuts. They may provide all of the functionality of conventional barrel nuts whilst being quicker and easier to install. Example barrel nuts according to the invention may also be suitable for applications where blind assembly is required. Moreover, example barrel nuts according to the invention can be especially suitable for high load applications.

The examples described below relate to a barrel nut for a fastener. The fastener may be for holding together two or more structures. Each example barrel nut is configured to prevent axial movement of the fastener relative to a structure on which the fastener is installed. Each example barrel nut comprises a first part and a second part pivotable relative to the first part. In some examples the second part is configured to engage with a stem of the fastener to resist relative axial movement of the fastener and the second part. In some examples the fastener may be installable by relative rotation of the fastener and the second part, about the axis of the fastener.

Figure 2C:
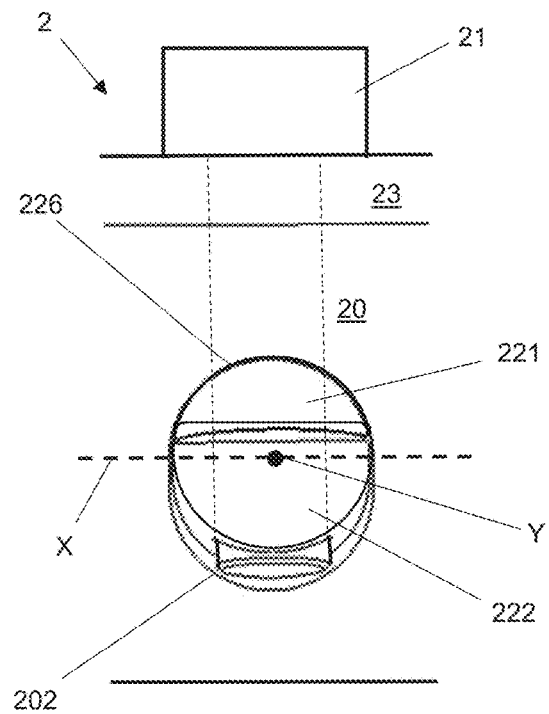
FIG. 2c is a schematic end view of the example assembly of FIG. 2b.

FIG. 2a is a perspective view of an example barrel nut 22 according to the invention, on a stem of an example fastener 21. FIGS. 2b and 2c show an assembly 2 comprising a first structure 20 and a second structure 23 held together by a fastener 21 in conjunction with the barrel nut 22. Except where explicitly stated otherwise, the shape of the barrel nut 22 may differ from what is illustrated. For example, the external corners of the barrel nut 22 are shown as rounded in the particular example. This feature may be advantageous for facilitating insertion of the barrel nut 22 into the first structure 20, but it is not essential.

The barrel nut 22 comprises a first part 221 and a second part 222. A bore 223a, 223b extends through the first part 221 and the second part 222, for receiving the stem of the fastener 21. The bore comprises a first bore part 223a defined by the first part 221 and a second bore part 223b defined by the second part 222. The first and second bore parts 223a, 223b may be coaxial in some relative positions of the first and second parts 221, 222 of the barrel nut 22, and may not be coaxial in other relative positions of the first and second parts 221, 222. In particular, the axis of the first bore part 223a may be angled relative to the axis of the second bore part 223b in some relative positions of the first and second parts 221, 222.

The second bore part 223b is configured to engage with the stem of the fastener 21 to resist relative axial movement of the fastener 21 and the second part 222. For example, the second bore part 223b may be threaded so as to be engageable with a threaded portion of the fastener stem, by relative rotation of the fastener 21 and the second part 222. The second bore part 223b has substantially the same diameter as the fastener stem. The first bore part 223a has a larger diameter than the second bore part 223b. This allows the first and second parts 221, 222 to be in a range of relative rotational positions when a fastener stem is received in the bore 223a, 223b. In particular, the first part 221 (e.g. as represented by the axis a of the first bore part 223a) and the second part 222 (e.g. as represented by the axis b of the second bore part 223b) may be angled with respect to each other by an angle θ, in any direction. The maximum value of θ is determined by the particular geometry of the first and second parts 221, 222 and of the fastener 21. FIG. 2b shows the barrel nut 22 in a configuration in which the second part 222 is angled with respect to the first part 221 by an angle close to the maximum value of θ.

The second part 222 comprises a load transmission surface 224 configured to contact a region 225 on the first part for transmitting loads thereto. In the particular example of FIG. 2a, the load transmission surface 224 is a part-spherical bearing surface, configured for sliding contact with a corresponding bearing surface 225 on the first part 221. The area of the contact region between the two bearing surfaces 224, 225 may be selected in accordance with the intended application of the barrel nut 22. For example, a barrel nut 22 intended for a relatively high-load application may have a larger contact region than a barrel nut 22 intended for a relatively low-load application.

FIG. 2b is a cross-section through an assembly 2 formed by the barrel nut 22, the fastener 21, and first and second structures 20, 23 which are held together by the fastener 21 and barrel nut 22. The stem of the fastener 21 passes through a fastener hole 201 which extends through the first and the second structures 20, 23. The axis of the fastener hole 201 is aligned with the second bore part 223b, but need not be aligned with the first bore part 223a, as will be explained further on. It can be seen from FIG. 2b that the first part 221 and the second part 222 are configured such that, when the two bearing surfaces 224, 225 are in contact with each other, an annular gap G exists between surfaces of the first and second parts that are immediately adjacent the bearing surfaces 224, 225. The gap G, together with the spherical bearing surface 224, permits the second part 222 to pivot relative to the first part 221 about two orthogonal axes (in particular, the X and Y axes).

The first part 221 comprises a load transmission surface 226 configured to contact a region on the structure for transmitting loads thereto. The load transmission surface 226 is shaped to match the region on the structure. In the particular example of FIGS. 2a-c, the first part 221 functions as a washer. FIG. 2c shows a view into a bore 202 in the first structure 20 in which the barrel nut 22 is received. It can be seen from this Figure that the cross-sectional shape of the upper surface (with respect to the orientation shown in FIG. 2c) matches the cross-sectional shape of the upper surface of the bore 202. In the illustrated example, the load transmission surface 226 is convex and the region is concave. The cross-sectional shape of the upper surface may be part-circular. When installed on the fastener 21, substantially the entire upper surface of the first part 221 is in close contact with the upper surface of bore 202 and can transfer loads thereto. Preferably, the load transmission surface 226 (that is, the part of the surface which is in close contact with a surface region of the first structure) provides at least 25% of the surface area of the first part 221. A relatively large load transmission surface 226 may be advantageous for high-load applications.

As a result of the above-described construction of the barrel nut 22, the second part 222 is pivotable relative to the first and second structures 20, 23 about two orthogonal axes (in particular, the X and Y axes). This allows the second part 222 to align with the axis of the fastener 21 whilst the first part 221 remains aligned with the bore 202. Load transmission between the first and second parts 221, 222, and between the first part 221 is unaffected by changes in the relative orientation of the first and second parts 221, 222. Consequently, any deviations in the angle of the fastener stem from the Z axis, whether unintentional due to manufacturing tolerances or intentional due to the shape of the first and or second structures (as is the case in FIG. 2b), can be accommodated (up to the maximum value of θ). Moreover, the installation of the fastener 21 is facilitated because the second part 222 can self-align about both the X and Y axes. Correct seating of the barrel nut 22 is ensured by the self-alignment, obviating the need to inspect the seating after installation and therefore making the barrel nut 22 suitable for use in applications where blind assembly is required. Since the risk of incorrect seating of the nut is considerably reduced or eliminated compared to the conventional barrel nut of FIG. 1, example barrel nuts such as the barrel nut 22 are particularly advantageous for high-load applications.

Figure 3A:
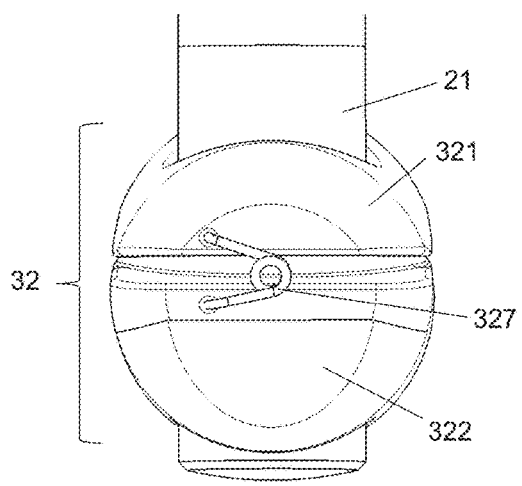
FIGS. 3a and 3b are perspective views of a further example barrel nut according to the invention.
Figure 3B:
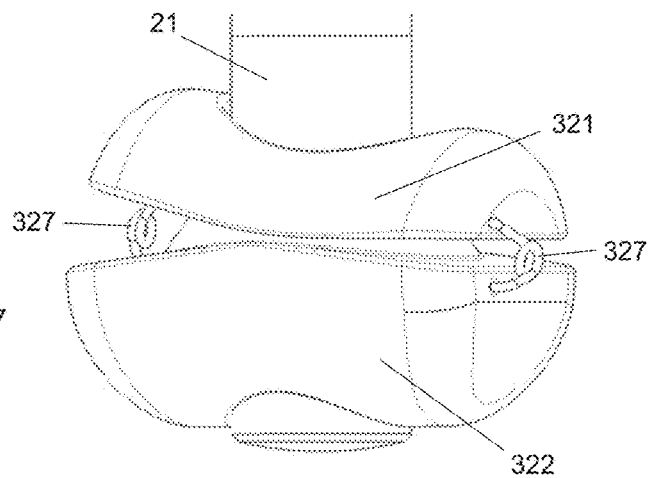

FIGS. 3a and 3b show a further example barrel nut 32 according to the invention, installed on the fastener 21. The barrel nut 32 comprises a first part 321 and a second part 322 which have the same features as the first part 221 and second part 222 of the example barrel nut 22 of FIGS. 2a-c. The barrel nut 32 additionally comprises retaining members 327 configured to resist separation of the first part 321 and the second part 322 whilst permitting relative pivoting movement of the first part 321 and the second part 322 about the X axis and the Y axis. In the illustrated example, each of the retaining members 327 comprises a hair spring, although any other suitable retaining mechanism may be used. Suitable alternative retaining mechanisms include, for example, an encapsulating flexible sleeve (similar to a stent), or an assembly substance applied to bearing surfaces 224 and 225 such that the first and second parts 321 and 322 remain as one but are free to move during installation. Preferably the retaining members 327 are resilient. In some examples the retaining members are configured to bias the first and second parts 321, 322 into a selected relative position. The purpose of the retaining members 327 is to maintain the barrel nut 32 in a particular configuration (e.g. a configuration in which the first and second bore parts are coaxial) during installation of the barrel nut 32 and the fastener 21. Advantageously, maintaining the barrel nut 32 in the default configuration facilitates arranging the barrel nut 32 on a structure, and also facilitates engaging the fastener stem with the barrel nut 32.

Figure 4:
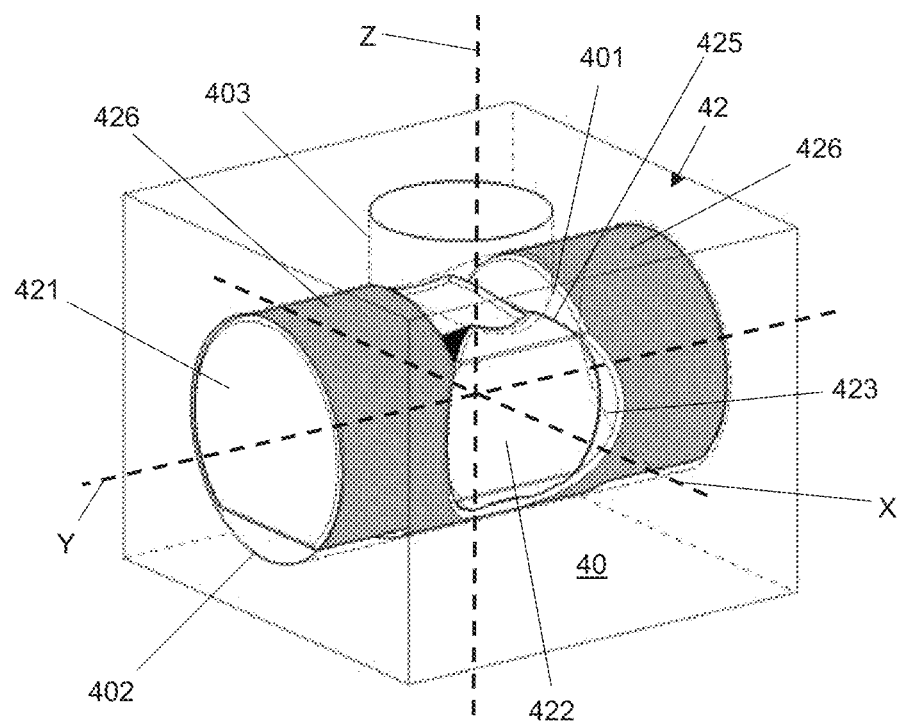
FIG. 4 is a perspective view of a further example barrel nut, together with a structure.

FIG. 4 shows an alternative barrel nut 42 according to the invention. The barrel nut 42 is disposed in a bore 402 in a structure 40. The barrel nut 42 is configured to engage with a fastener (not shown) which may be of the same type as the example fastener 21 described above. The barrel nut 42 has a different structure to the example barrel nuts 22, 32 described above, but it achieves a similar effect. In particular, a part of the barrel nut 42 which is configured to engage with the fastener is pivotable about two orthogonal axes relative to a structure on which the barrel nut is installed.

The barrel nut 42 comprises a first part and a second part. The first part comprises a first cylindrical body 421 having an axis Y, a first radial bore 401 extending through the body, and a second radial bore 423 extending through the body. The second radial bore 423 is orthogonal to and intersects with the first radial bore 401. The first bore 401 has an axis Z and the second bore has an axis X. The axes of the first cylindrical body, first bore 401 and second bore 423 are mutually orthogonal, at least in a nominal default configuration of the barrel nut 42 (as shown in FIG. 4). In FIG. 4 the first bore 401 is shown as having the same diameter as and being coaxial with a fastener hole 403 provided in the structure 40. However; it will typically be the case that the first bore 401 has a larger diameter than the fastener hole 403, and the fastener hole 403 may be angled relative to the first bore 401, as will be explained below.

The second part comprises a second cylindrical body 422, which is substantially similar in structure and function to the example conventional barrel nut 12 of FIGS. 1a and 1b. The second cylindrical body 422 is disposed within the second bore 423 and has a diameter substantially equal to the diameter of the second bore 423. The second cylindrical body 422 comprises a third bore (not visible in FIG. 4). The third bore may be coaxial with the first bore 401 in the default configuration of the barrel nut 42. The diameter of the third bore is substantially equal to the diameter of the stem of the fastener with which the barrel nut 42 is configured to engage. The diameter of the third bore is smaller than the diameter of the first bore 401.

The second cylindrical body 422 is pivotable about the X axis relative to the first cylindrical body 421. The outer surface of the second cylindrical body 422 is configured for sliding contact with the inner surface of the second bore 423, to permit the pivoting. Each of these surfaces may be considered to be a bearing surface. The first cylindrical body 421 is pivotable about the Y axis with respect to the structure 40. The outer surface of the first cylindrical body 421 is configured for sliding contact with the inner surface of the structure bore 402, to permit the pivoting. Each of these surfaces may be considered to be a bearing surface. It will be appreciated that pivoting of the first cylindrical body 421 causes corresponding pivoting of the second cylindrical body 422. The second cylindrical body 422 is thereby pivotable relative to the structure 40 about both the X axis and the Y axis. This enables the barrel nut 42 to engage with a fastener stem which is at an angle (in any direction) to the Z axis. The magnitude of the deviation angle that can be accommodated will depend on the relative dimensions of the first bore 401 and the fastener stem. As with the example barrel nuts 22 and 32, there will be a maximum magnitude of the angle that can be accommodated. The design of the barrel nut 42 may be tailored to enable it to accommodate a desired amount of deviation of the fastener stem angle.

Loads are transferred from the barrel nut 42 to the structure 40 via a load transmission surface 426, which comprises substantially all of the upper (with respect to the orientation shown in FIG. 4) surface of the first cylindrical body 421. The load transmission surface 426 may have substantially the same features as the load transmission surface 226 of the example barrel nut 22. The load transmission surface 426 is in close contact with an upper surface region of the structure bore 402. This contact is not altered by varying the pivotal position of the first cylindrical body 421 or the pivotal position of the second cylindrical body 422. Similarly, loads are transferred from the second cylindrical body 422 to the first cylindrical body 421 via a load transmission surface 425 which comprises substantially all of the upper surface of the second cylindrical body 422. The load transmission surface 425 of the second cylindrical body 422 may have substantially the same features as the load transmission surface 426 of the first cylindrical body 421, except for size and orientation. The load transmission surface 425 of the second cylindrical body 422 is in close contact with an upper surface region of the second bore 423. This contact is not altered by varying the pivotal position of the second cylindrical body 422 or the pivotal position of the first cylindrical body 421. The barrel nut 42 can therefore accommodate deviations in the fastener stem angle without impairing load transfer between the fastener stem and the barrel nut 42, or between the barrel nut 42 and the structure 40.

In the illustrated example, the cross-section of the first cylindrical body 421 is not perfectly circular. Instead, a lower segment is missing, at least at one end of the first cylindrical body 421. The cross-sectional profile of the barrel nut is therefore configured such that a gap exists between an outer surface of the barrel nut 42 and an inner surface of the bore 402, when the barrel nut 42 is received in the bore 402. This feature is not essential, but it is advantageous in that it facilitates insertion of the barrel nut 42 into the structure bore 402. In particular, this feature may facilitate aligning the first bore 401 with the fastener hole 403 (or with an intended location of the fastener hole 403, as the fastener hole 403 may not have been created at the time at which the barrel nut 42 is inserted into the structure bore 402. A similar feature may be provided on the second cylindrical body 422, to facilitate insertion and or alignment of the second cylindrical body 422 in the second bore 423. A further advantage of a missing segment of the first cylindrical body and/or the second cylindrical body is that the barrel nut 42 contains less material, and can therefore be lighter.

Figure 7A:
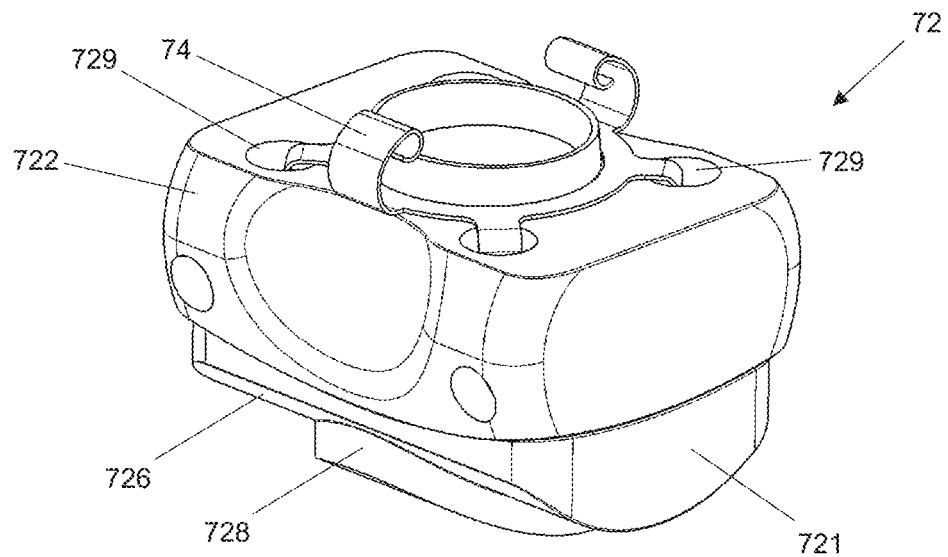

FIGS. 7a-c show a further example barrel nut 72 according to the invention. FIGS. 7a and 7b are views of the barrel nut 72 in an assembled and an exploded state, respectively; and FIG. 7c is a cross section through an assembly 7 comprising the barrel nut 72 installed on a structure 70. The barrel nut 72 comprises a first part 721 and a second part 722. The barrel nut 72 additionally comprises a resilient member 74 configured to assist in retaining the barrel nut 72 in a bore 702 in the structure 70, as will be further explained below. The example barrel nut 72 is shown in an inverted position as compared to the example barrel nuts 22 and 32—that is, a fastener engaged with the example barrel nut 72 would have its head end toward the bottom of the page and its tail end toward to the top of the page.

The first part 721 is similar to the first part 221 of the example barrel nut 22, and similarly comprises a load transmission surface 726 for transmitting loads to the structure 70 having substantially the same features as the load transmission surface 226, and a first bore part 723a having substantially the same features as the first bore part 223a. Features of the first part 721 which are not specifically described below may be assumed to be the same as the corresponding features of the example first part 221. However, there are certain differences between the design of the example first part 721 and the example first part 221, which may confer advantages for certain applications.

Like the first part 221, the example first part 721 comprises a bearing surface 725. However, unlike the bearing surface 225, the bearing surface 725 is a part-spherical surface configured to match a corresponding part-spherical bearing surface 724 on the second part 722. Furthermore, the bearing surface 725 comprises the entire upper surface of the first part 721.

The load transmission surface 726 of the first part 721 comprises a protrusion configured to engage with a corresponding recess in the inner surface of the bore 702. In the illustrated example the protrusion comprises an annular lip 728 which protrudes from the load transmission surface 726 and which is coaxial with the second bore part 223b. The annular lip 728 is configured to be received within the mouth of the bore 701 where it intersects with the bore 702. The outer diameter of the lip 728 is smaller than the diameter of the bore 701. A limited amount of rotational movement of the lip 728 relative to the mouth of the bore 701, about the axis of the barrel nut 72, is thereby permitted. This enables the first part 721 to pivot about the axis of the bore 702 when the barrel nut is installed in the bore 702, by an amount determined by the difference between the diameter of the lip 728 and the diameter of the bore 71. As explained above, the ability of the barrel nut to pivot about the axis of the bore 702 when installed in the bore 702 enables the barrel nut to seat correctly even if the angle of the fastener stem is not perfectly parallel to the axis of the bore 701.

The lip 728, together with the retaining member 74, acts to retain the barrel nut 72 in the bore 702. In particular, the lip 728 constrains relative translational movement of the barrel nut 72 and bore 702 in the axial direction, and also constrains relative rotational movement of the barrel nut 72 and bore 702 about the axis of the bore 702. This enables the structure 70 to be transported (e.g. to a final assembly line) with the barrel nut 72 installed in the bore 702 without risk of the barrel nut 72 sliding out of the bore 702 or rotating to a rotational position that is unsuitable for engaging a fastener with the barrel nut (e.g. a rotational position in which the first and second bore parts 223a, 223b are substantially misaligned with the bore 701).

The second part 722 is similar to the second part 222 of the example barrel nut 22, and similarly comprises a second bore part 723b having substantially the same features as the second bore part 223b. Features of the second part 722 which are not specifically described below may be assumed to be the same as the corresponding features of the example second part 222. However, there are certain differences between the design of the example second part 722 and the example second part 222, which may confer advantages for certain applications.

The second part 722 has a part-spherical bearing surface 724 that comprises the entire lower surface of the second part 722. The curvature of the bearing surface 724 matches the curvature of the bearing surface 725 on the first part 721. An upper surface (that is, a surface opposite the bearing surface 725) of the second part 722 is substantially flat, rather than being curved such that it abuts the inner surface of the bore 702 in the structure 70 when installed on the structure 70. The cross-sectional profile of the barrel nut 72 is thereby configured such that a gap exists between an outer surface of the barrel nut 72 and an inner surface of the bore 702 when the barrel nut 72 is received in the bore 702. The part of the outer surface of the barrel nut 72 that is adjacent the gap—which in this example is the flat upper surface of the second part 722—is opposite the load transmission surface 726.

A consequence of the second part having a substantially flat upper surface is that the barrel nut 72 contains less material, and can therefore be lighter, than if the second part 722 had an upper surface configured to abut the inner surface of the bore 702. The load transmitting function of the barrel nut 72 is not affected by the second part having a substantially flat upper surface, because substantially all load is transmitted from the barrel nut 72 to the structure 70 by the load transmission surface 726.

A deformable locking feature 730 is provided on the outer surface of the barrel nut, adjacent the gap created by the flat upper surface of the second part. In the illustrated example, the deformable locking feature has the form of an annular upstanding lip 730 provided on the upper surface of the second part 722, coaxial with the second bore part 723b. The diameter of the lip 730 may be smaller than the diameter of the second bore part 723b. The diameter of the lip 730 may be substantially equal to or slightly smaller than the diameter of a shaft of a fastener intended to be engaged with the barrel nut 72. The lip 730 may therefore become deformed when such a fastener is engaged with the barrel nut 72, in order to resist relative rotation of the fastener and the second part 722.

Four recesses 729 are provided in the upper surface of the second part 722. The purpose of the recesses 729 is to provide features that the resilient member 74 can engage with, to prevent relative rotation about the axis of the second bore part 723b of the resilient member 74 and the second part 722. In other examples the number of recesses 729 may be other than four. In some examples a different type of engagement feature (other than recesses) may be used to prevent relative rotation of the resilient member 74 and the second part 722.

The resilient member 74 is configured to exert a downward force on the barrel nut 72 when the barrel nut is installed in the bore 702. The resilient member 74 is configured to push against the outer surface of the barrel nut and against an inner surface of the bore 702, when the barrel nut 72 is received in the bore 702. The downward force on the barrel nut 72 may prevent the lip 728 from disengaging with the bore 701, and therefore ensure that the lip 728 performs the retaining functions described above. The resilient member 74 may exert the downward force by having resilient components such as springs, which are configured to be compressed between the upper surface of the second part 722 and an inner surface of the bore 702 when the barrel nut 72 is installed in the bore 702.

In the illustrated example the resilient member 74 comprises a clip configured to engage with the upper surface of the second part 722 such that relative movement of the clip and second part 722 is substantially prevented. In the particular example, the clip comprises an opening configured to surround the lip 730, such that relative translational movement of the clip 74 and the second part 722, in the plane of the upper surface of the second part 722, is substantially prevented. Additionally, the clip 74 comprises four legs configured to extend into the four recesses 729. The engagement of the legs with the recesses 729 substantially prevents relative rotational movement of the clip 74 and the second part 722. The clip 74 further comprises a pair of arms which extend upwardly from the upper surface of the second part 722. Each arm is in the form of a spiral spring. The arms of the clip 74 may be formed from any suitable resilient material, such as sheet metal. It may be advantageous for the clip 74 to be manufactured as a unitary component.

The resilient member 74 is biased into a configuration in which the distance between an uppermost part of the resilient member 74 and a lowermost part of the lip 728 is greater than the diameter of the bore 702. In order to install the barrel nut 72 in the bore 702, it is therefore necessary to compress the resilient member 74 by an amount such that the distance between an uppermost part of the resilient member 74 and a lowermost part of the lip 728 is less than or equal to the diameter of the bore 702, during a process of inserting the barrel nut 72 into the bore 702. This compression may be achieved by any suitable tool or technique known in the art.

Any of the particular advantageous features of the example barrel nut 72—namely the flat non-loadbearing surface, the resilient member 74, and the annular lip 728 protruding from the load transmission surface—may be provided, together or individually, on any barrel nut according to the invention, including barrel nuts having the same general type as the example barrel nut 42 shown in FIG. 4.

Example barrel nuts according to the invention may be particularly advantageous for use on aircraft. FIG. 5 shows an example aircraft 500 which comprises one or more such barrel nuts. In particular, the aircraft comprises a wing 501, to which an engine mounting pylon 502 is attached. A structure of the engine mounting pylon 502 is attached to a structure of the wing 501 by a plurality of fasteners, at least some of which are engaged with barrel nuts according to the invention. The attached structures, fasteners and barrel nuts together form assemblies according to the invention. The aircraft 500 also includes a further wing and engine mounting pylon, which may be attached in the same manner as the wing 501 and pylon 502. Barrel nuts according to the invention may also advantageously be used in various other parts of the aircraft 500, such the joint between the vertical tail plane (VTP) 503 and the fuselage 504.

An example process 600 of forming an example assembly according to the invention will now be described with reference to FIG. 6. The process of FIG. 6 may be performed using any of the example barrel nuts described above.

Figure 6:
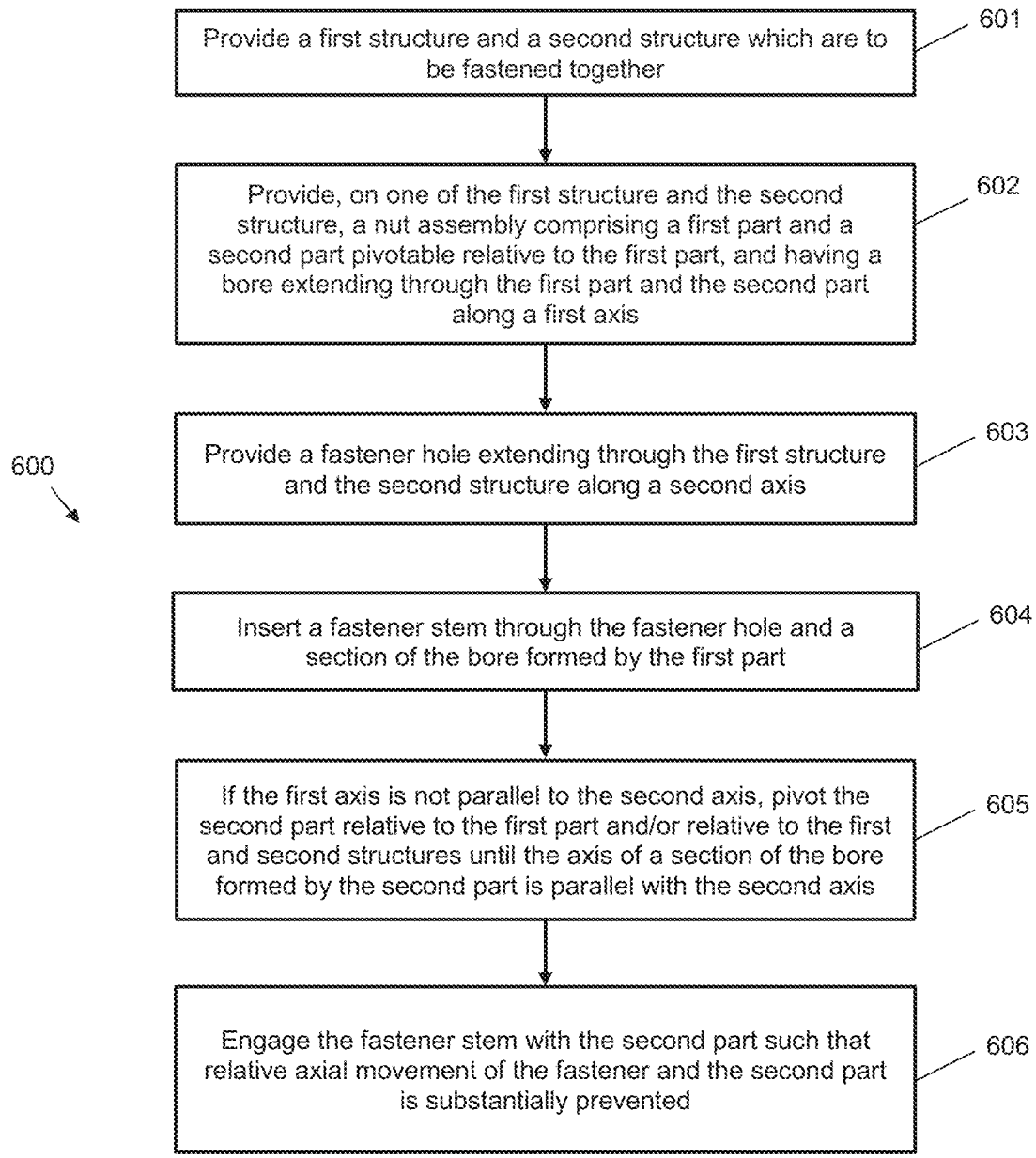
FIG. 6 is a flow chart illustrating an example method of forming an assembly according to the invention.

In block 601 of FIG. 6, a first structure and a second structure are provided, which are to be fastened together by one or more fasteners in conjunction with barrel nuts according to the invention. In some examples the first structure and the second structure may be aircraft structures. For example, the first structure may be a component of an engine mounting pylon and the second structure may be a component of a wing box.

In block 602 a barrel nut is provided on one of the first structure and the second structure. The barrel nut comprises a first part and a second part pivotable relative to the first part. The barrel nut has a bore extending through the first part and the second part along a first axis. The barrel nut may, for example, be any of the example barrel nuts 22, 32, 42 described above. The barrel nut may be provided on the structure by inserting the barrel nut into a bore provided in the structure. Inserting the barrel nut into a bore provided in the structure may comprise compressing at least a part of the barrel nut. Alternatively, the barrel nut may be provided on the structure by attaching a part of the barrel nut to the structure. The barrel nut is provided on the structure in a manner such that the second part of the barrel nut is pivotable about two orthogonal axes relative to the structure. In some examples, both of the first and second parts of the barrel nut are pivotable relative to the structure. In other examples, the rotational position of the first part of the barrel nut is substantially fixed relative to the structure. In some examples, pivoting of the first and/or second parts of the barrel nut relative to the structure are constrained. The barrel nut is provided on the structure in a nominal default configuration of the barrel nut in which the part of the bore which extends through the first part is coaxial with the part of the bore which extends through the second part.

The barrel nut may be provided on the structure in a manner such that at least the second part is prevented from rotating about the first axis. The barrel nut may be provided on the structure in a manner such that axial movement of the barrel nut relative to the structure is constrained or substantially prevented. The barrel nut may be provided on the structure in a manner such that relative rotation about the axis of the barrel nut of the barrel nut and the structure is constrained or substantially prevented. In some examples providing the barrel nut on the structure may comprise engaging a feature on the barrel nut (such as the lip 728 of the example barrel nut 72) with a feature on the structure (such as the bore 701 of the example structure 70).

In block 603 a fastener hole is provided, which extends through the first structure and the second structure along a second axis. The second axis may be parallel to or the same as the first axis. The second axis may be at an angle to the first axis. In some examples, the fastener hole may be created such that the second axis is at a particular angle to the first axis. The diameter of the fastener hole may be substantially equal to the diameter of a stem of a fastener intended to be installed in the fastener hole. Providing a fastener hole may be performed by any suitable technique, such as drilling or punching. Block 603 may be performed before, after or simultaneously with block 602.

In block 604 a fastener stem is inserted through the fastener hole provided in block 603, and through the section of the bore formed by the first part. Block 604 may be performed by any suitable means, such as manually, or by an industrial manufacturing robot.

In block 605, if the first axis is not parallel or equal to the second axis the second part is pivoted relative to the first part and/or relative to the first and second structures until the axis of a section of the bore formed by the second part is parallel with the second axis. The pivoting may be driven by engagement of the tip of the fastener stem with the mouth of the section of the bore formed by the second part. The fastener stem tip, and or the section of the bore formed by the second part may comprise one or more features to facilitate such engagement, such as a conical/tapered section. The pivoting may occur automatically in response to an insertion movement of the fastener stem.

In block 606, the fastener stem is engaged with the second part such that relative axial movement of the fastener and the second part is substantially prevented. In some examples, the section of the bore formed by the second part and the fastener stem are correspondingly threaded. In such examples, engaging the fastener stem with the second part comprises rotating the fastener stem about its axis whilst preventing rotation of the second part about the fastener stem axis. However; any other known mechanism for engaging a fastener with a nut could be used. Block 606 may be performed by any suitable means, such as manually, or by an industrial manufacturing robot.

It may be intended to join the first and second components by multiple fasteners. In such cases the method 600 may be performed in respect of each of the fasteners. The method 600 may be performed sequentially, simultaneously, or a combination of both sequentially and simultaneously, until all fasteners intended to be used to join the first and second components have been installed.

The result of the process 600 is an assembly comprising a first structure, a second structure; a fastener extending through the first structure and the second structure; and a two-part barrel nut engaged with the fastener such that separation of the first structure and the second structure is substantially prevented by the engagement of the fastener with the two-part barrel nut. The two-part nut comprises a first nut part having a first bearing surface and a second nut part having a second bearing surface in contact with the first bearing surface. The first and second bearing surfaces are configured for rotational movement relative to each other about a first axis. In some examples the first and second bearing surfaces are further configured for rotational movement relative to each other about a second axis orthogonal to the first axis. In some examples the two-part nut is configured for rotational movement relative to one of the first and second structures about the second axis. The assembly may be, for example, the example assembly 2 described above.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. A barrel nut for a fastener, the barrel nut being configured to prevent axial movement of the fastener relative to a structure on which the fastener is installed, wherein the barrel nut comprises:
   a first part and
   a second part pivotable relative to the first part,
   wherein the first part comprises a washer having a first bearing surface,
   the second part comprises a nut having a second bearing surface configured to contact the first bearing surface in an operational configuration of the barrel nut, and
   wherein the second bearing surface is part-spherical to permit relative pivoting movement of the first part and the second part about two orthogonal axes.

2. A barrel nut according to claim 1, wherein the barrel nut is configured such that the second part is pivotable relative to the first part about at least one axis and is pivotable relative to the structure about two orthogonal axes.

3. A barrel nut according to claim 1, wherein the first part comprises a load transmission surface configured to contact a region on the structure for transmitting loads thereto, and/or wherein the load transmission surface is shaped to match the region on the structure.

4. A barrel nut according to claim 3, wherein the load transmission surface provides at least 25% of the surface area of the first part.

5. A barrel nut according to claim 1, wherein the second part comprises a load transmission surface configured to contact a region on the first part for transmitting loads thereto.

6. A barrel nut according to claim 1, wherein the second part is configured to engage with a stem of the fastener to resist relative axial movement of the fastener and the second part.

7. A barrel nut according to claim 1, comprising a bore extending through the first part and the second part, the bore being configured to receive a stem of the fastener, and/or wherein a part of the bore extending through the first part has a larger diameter than a part of the bore extending through the second part.

8. A barrel nut according to claim 1, further comprising a retaining member configured to resist separation of the first part and the second part whilst permitting relative pivoting movement of the first part and the second part about two orthogonal axes.

9. A barrel nut according to claim 1, wherein the first part comprises a first cylinder having a first radial bore to receive a stem of the fastener, and a second radial bore orthogonal to and intersecting with the first bore, and wherein the second part comprises a second cylinder disposed within the second radial bore, the second cylinder having a third radial bore configured to receive and engage with the stem of the fastener.

10. A barrel nut according to claim 9, wherein an interior surface of the second radial bore is configured for sliding contact with an exterior surface of the second cylinder to permit pivoting of the second part relative to the first part about the axis of the second cylinder, and wherein an exterior surface of the first cylinder is configured for sliding contact with a surface of the structure to permit pivoting of the barrel nut relative to the structure about the axis of the first cylinder.

11. A barrel nut according to claim 1, wherein the cross-sectional profile of the barrel nut is configured such that a gap exists between an outer surface of the barrel nut and an inner surface of a bore in which the barrel nut is configured to be received, when the barrel nut is received in the bore, and/or wherein an outer surface of the barrel nut adjacent the gap is substantially flat.

12. A barrel nut according to claim 11, further comprising a resilient member provided on the outer surface of the barrel nut adjacent the gap, wherein the resilient member is configured to push against the outer surface of the barrel nut adjacent the gap and against an inner surface of the bore adjacent the gap, when the barrel nut is received in the bore.

13. A barrel nut according to claim 11, wherein a deformable locking feature is provided on the outer surface of the barrel nut adjacent the gap, coaxial with a bore extending through the barrel nut.

14. A barrel nut according to claim 1, wherein a surface of the barrel nut configured to abut an inner surface of a bore in which the barrel nut is received comprises a protrusion configured to engage with a corresponding recess in the inner surface of the bore, and/or wherein the protrusion is smaller than the recess, such that a limited amount of rotational movement of the protrusion relative to the recess, about the axis of the barrel nut, is permitted when the protrusion is engaged with the recess.

15. An assembly comprising:
a first structure;
a second structure;
a fastener extending through the first structure and the second structure; and
a two-part barrel nut engaged with the fastener such that separation of the first structure and the second structure is substantially prevented by the engagement of the fastener with the two-part barrel nut;
wherein the two-part barrel nut comprises a first nut part having a first bearing surface and a second nut part having a second bearing surface in contact with the first bearing surface;
wherein the first and second bearing surfaces being configured for rotational movement relative to each other about a first axis; and,
wherein the second bearing surface is part-spherical to permit relative pivoting movement of the first part and the second part about a second axis orthogonal to the first axis.

16. An assembly according to claim 15, wherein:
the two-part barrel nut is configured for rotational movement relative to one of the first and second structures about the second axis.

17. An assembly according to claim 15, wherein the two-part barrel nut is a barrel nut comprising a first part and a second part pivotable relative to the first part.

18. An assembly according to claim 15, wherein each of the structures comprises an aircraft structure.

19. An aircraft comprising an assembly according to claim 15.

* * * * *